United States Patent [19]

Buliga et al.

[11] Patent Number: 5,501,869
[45] Date of Patent: Mar. 26, 1996

[54] FAT-FREE TABLESPREAD AND METHOD OF MAKING

[75] Inventors: Gregory S. Buliga, Mount Prospect; Mark S. Miller, Arlington Heights, both of Ill.; William F. Powell, Liverpool, England; Daniel G. Lis, Wheeling, Ill.; R. G. Krishnamurthy, Glenview, Ill.; Vernon C. Witte, Naperville, Ill.; Sharon Tomski, Mundelein, Ill.

[73] Assignee: Kraft Foods, Inc., Northfield, Ill.

[21] Appl. No.: 255,454

[22] Filed: Jun. 8, 1994

Related U.S. Application Data

[63] Continuation-in-part of Ser. No. 138,734, Oct. 18, 1993, abandoned, which is a continuation-in-part of Ser. No. 997,689, Dec. 28, 1992, abandoned.

[51] Int. Cl.[6] .................................................. A23D 7/015
[52] U.S. Cl. ........................ 426/658; 426/519; 426/538; 426/578; 426/603; 426/661; 426/804
[58] Field of Search ................................ 426/538, 578, 426/661, 658, 519, 603, 804

[56] References Cited

U.S. PATENT DOCUMENTS

| | | | |
|---|---|---|---|
| 3,519,436 | 7/1970 | Bauer et al. | 99/123 |
| 3,669,688 | 6/1972 | Thompson | 99/139 |
| 3,717,475 | 2/1973 | Germino et al. | 99/134 |
| 3,944,680 | 3/1976 | vanPelt et al. | 426/564 |
| 3,962,465 | 6/1976 | Richter et al. | 426/48 |
| 3,986,890 | 10/1976 | Richter et al. | 127/38 |
| 4,089,981 | 5/1978 | Richardson | 426/104 |
| 4,143,163 | 3/1979 | Hutchison et al. | 426/96 |
| 4,205,095 | 5/1980 | Pike et al. | 426/607 |
| 4,238,520 | 12/1980 | Miller et al. | 426/573 |
| 4,273,790 | 6/1981 | Bosco et al. | 426/335 |
| 4,273,795 | 6/1981 | Bosco et al. | 426/602 |
| 4,279,941 | 7/1981 | Bosco et al. | 426/602 |
| 4,284,655 | 8/1981 | Miller et al. | 426/602 |
| 4,308,294 | 12/1981 | Rispoli et al. | 426/564 |
| 4,401,681 | 8/1983 | Dahle | 426/94 |
| 4,407,836 | 10/1983 | Bosco et al. | 426/576 |
| 4,415,599 | 11/1983 | Bos | 426/578 |
| 4,473,594 | 9/1984 | Miller et al. | 426/578 |
| 4,479,973 | 10/1984 | Holley | 426/573 |
| 4,510,166 | 4/1985 | Lenchin et al. | 426/565 |
| 4,536,408 | 8/1985 | Morehouse et al. | 426/250 |
| 4,567,053 | 1/1986 | Lindley | 426/538 |
| 4,592,919 | 6/1986 | Winters | 426/568 |
| 4,597,981 | 7/1986 | Kastin | 426/660 |
| 4,615,897 | 10/1986 | Brown et al. | 426/576 |

(List continued on next page.)

FOREIGN PATENT DOCUMENTS

| | | |
|---|---|---|
| 0237120 | 9/1987 | European Pat. Off. . |
| 0298561 | 11/1989 | European Pat. Off. . |
| 0380170A1 | 8/1990 | European Pat. Off. . |
| WO9107106 | 5/1991 | European Pat. Off. . |
| WO91/12728 | 9/1991 | European Pat. Off. . |
| 509707 | 10/1992 | European Pat. Off. . |
| 0509707 | 10/1992 | European Pat. Off. . |
| WO93/17564 | 9/1993 | European Pat. Off. . |
| 0558141A1 | 9/1993 | European Pat. Off. . |
| 0596546 | 5/1994 | European Pat. Off. . |
| 0605217A2 | 7/1994 | European Pat. Off. . |
| 36132480 | 10/1986 | Germany . |
| 2229077 | 9/1990 | United Kingdom . |

OTHER PUBLICATIONS

Fibruline Technical Bulletin, Cosucra K, France.
Pszcola, D. "Carbohydrate–Based Ingredient Performs Like Fat" Food Technology, vol. 45, No. 8, pp. 262–263, 276 (Aug. 1991).

*Primary Examiner*—Helen Pratt
*Attorney, Agent, or Firm*—Fitch, Even, Tabin & Flannery

[57] ABSTRACT

A non-fat edible plastic dispersion which has rheological properties similar to solid margarine or squeezable margarine. The plastic dispersion includes a fat mimetic selected from the group consisting of gelling type maltodextrins, starch modified by acid hydrolysis to remove amorphous regions therefrom and branched chain amylopectin starch and inulin.

32 Claims, 2 Drawing Sheets

U.S. PATENT DOCUMENTS

| | | | |
|---|---|---|---|
| 4,622,233 | 11/1986 | Torres | 426/548 |
| 4,704,293 | 11/1987 | Moore et al. | 426/573 |
| 4,767,635 | 8/1988 | Merritt et al. | 426/272 |
| 4,832,976 | 5/1989 | Griffin et al. | 426/660 |
| 4,859,484 | 8/1989 | Bielskis et al. | 426/573 |
| 4,861,604 | 8/1989 | Tang et al. | 426/94 |
| 4,906,490 | 3/1990 | Bakal et al. | 426/603 |
| 4,917,915 | 4/1990 | Cain et al. | 426/573 |
| 4,952,413 | 8/1990 | LaBarge et al. | 426/6 |
| 4,954,361 | 9/1990 | Girsh | 426/580 |
| 4,956,193 | 9/1990 | Cain et al. | 426/573 |
| 4,988,531 | 1/1991 | Moore et al. | 426/578 |
| 5,080,921 | 1/1992 | Reimer | 426/564 |
| 5,232,735 | 8/1993 | Kurtz et al. | 426/649 |
| 5,260,083 | 11/1993 | Brain et al. | 426/573 |
| 5,294,455 | 3/1994 | O'Brien et al. | 426/573 |

FAT-FREE TABLESPREAD AND METHOD OF MAKING

CROSS-REFERENCE TO RELATED APPLICATIONS

This application is a continuation-in-part of application Ser. No. 138,734 filed Oct. 18, 1993, now abandoned which is a continuation-in-part of application Ser. No. 997,689 filed Dec. 28, 1992, now abandoned.

FIELD OF THE INVENTION

The present invention relates generally to a non-fat product that has the appearance of margarine and squeezable margarine. In particular, the invention relates to a non-fat product that has the appearance and taste of margarine and squeezable margarine, but has substantially fewer calories and has no fat.

BACKGROUND OF THE INVENTION

In recent years, there has been a substantial research effort directed to reducing or eliminating the fat in various water continuous food products, such as ice cream, pourable dressings, salad dressing, mayonnaise and cheese. To produce these fat reduced products, many fat mimetic materials have been developed.

U.S. Pat. No. 4,734,287 to Singer, et al. describes a proteinaceous, water-dispersible macrocolloid comprising substantially non-aggregated particles of dairy whey protein. U.S. Pat. No. 4,911,946 to Singer, et al. discloses a fat substitute which comprises water-dispersable macrocolloid particles having a substantially spheroidal shape and a particle size distribution effective to impart the substantially smooth organoleptic character of an oil-and-water emulsion. The particles are produced by subjecting carbohydrate materials such as quinoa starch, calcium alginate, cross-linked dextran, gellan gum, konjac, mannan, chitin, schizophyllan and chitosan to high shear forces by introducing a carbohydrate solution into a highly turbulent reaction zone. This treatment produces gelled microparticles having the spheroidal shape and size described in this patent. U.S. Pat. No. 5,104,674 to Chen, et al. describes fat mimetic materials which are produced by subjecting fibers of a polysaccharide gum and various protein sources to high shear forces to microfragment the particles.

While numerous fat mimetic materials have been produced, such fat mimetic materials are almost universally used in a water continuous product, such as a pourable dressing, mayonnaise or salad dressing. Only recently have attempts been made to produce a non-fat substitute for fat continuous systems, such as butter and margarine. U.S. Pat. No. 4,956,193 to Cain, et al. describes a non-fat edible plastic dispersion which is a substitute for butter or margarine. The edible plastic dispersion of the Cain, et al. patent includes at least two condensed phases, at least one of which is continuous. The dispersion includes two gel forming compositions (A) and (B). Gel forming composition A contains 1–8 times the critical concentration of a gelling agent (a) selected from the group consisting of gelatin, kappa carrageenan, iota carrageenan, alginate, agar, gellan, pectin and mixtures thereof. Gel forming composition B also contains 1–8 times the critical concentration of a gelling agent (b) selected from the group consisting of gelling starch, denatured whey protein, denatured bovine serum protein, denatured soy protein, microcrystalline cellulose and mixtures thereof.

The present invention is directed to providing non-fat or low-fat substitutes for fat-containing spreads, such as margarine. The present invention is also directed to providing a non-fat or low-fat substitute for margarine products which are known in the art as being "squeezable"; meaning that the product can be dispensed by squeezing a plastic container containing the viscous margarine. Such products are available in the marketplace today containing high levels of fat of about 64%.

SUMMARY OF THE INVENTION

Figure 1:
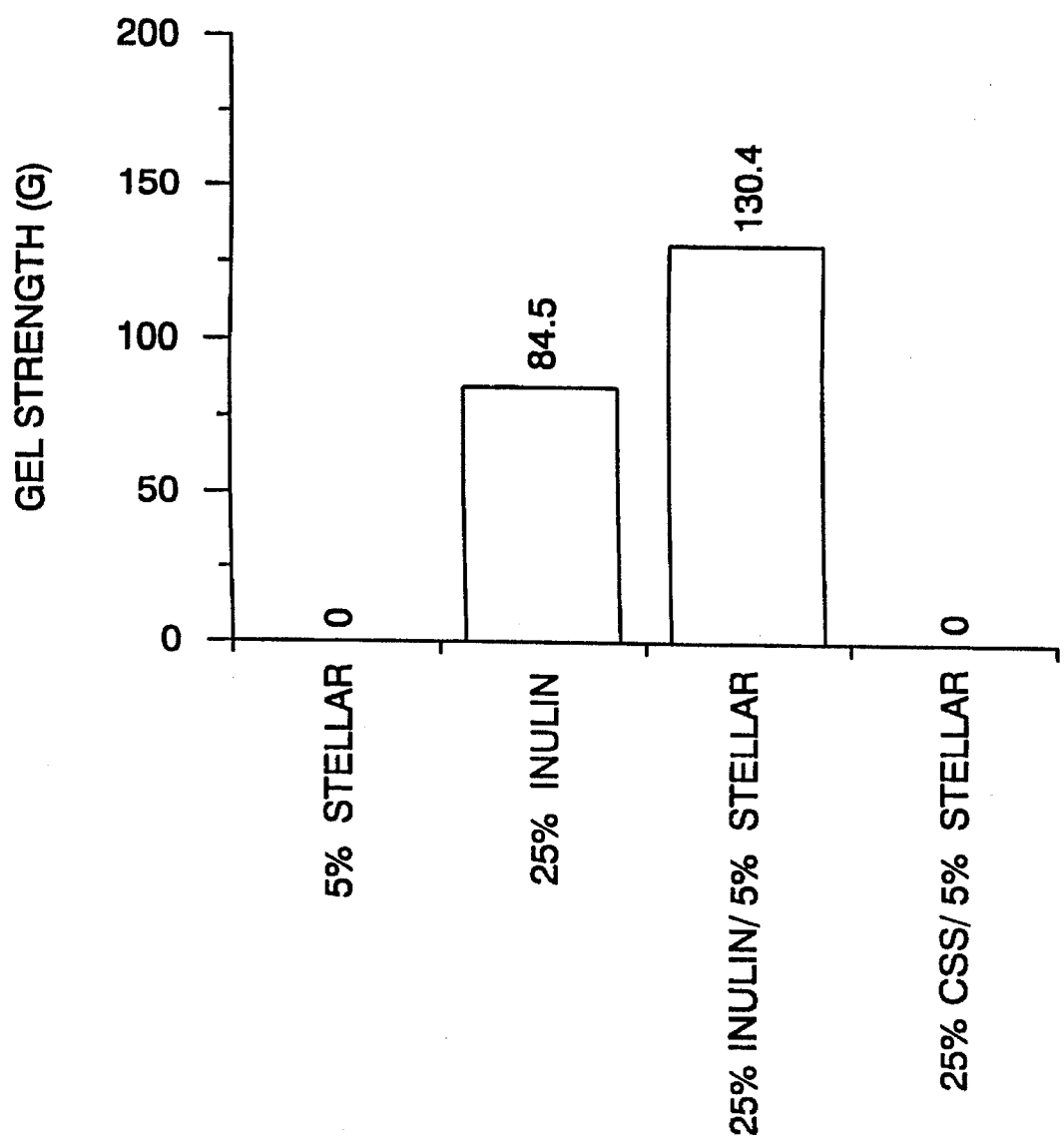
FIG. 1 is a plot of the gel strength of various materials processed in accordance with the invention.

The present invention relates to non-fat edible dispersions which have rheological properties similar to either solid margarine or squeezable margarine. The non-fat dispersions include a fat mimetic selected from the group consisting of gelling type maltodextrins, starch modified by acid hydrolysis, and a branched chain amylopectin starch, an optional bulking agent selected from the group consisting of non-gelling maltodextrins, polydextrose and low DE corn syrup solids and a texturizing agent, which is inulin.

A non-fat edible dispersion which emulates squeezable margarine can also be prepared from compositions which include a fat mimetic selected from the group consisting of gelling type maltodextrins and starch modified by acid hydrolysis, a bulking agent selected from the group consisting of non-gelling maltodextrins, polydextrose and low DE corn syrup solids and a gum.

DETAILED DESCRIPTION OF THE INVENTION

The fat mimetics useful in both the non-fat margarine type formulation and the non-fat squeezable formulation are selected from the group consisting of gelling type maltodextrins, starch modified by acid hydrolysis and branched chain amylopectin starch. An example of a gelling type maltodextrin is marketed under the tradename Paselli™ by the Avebe Company of the Netherlands. Paselli™ is a potato starch enzymatically modified to produce a maltodextrin having a very low DE, below 5.

Starch modified by acid hydrolysis is a Naegeli amylodextrin. Naegeli amylodextrin is produced by suspending starch granules in 7.5% to 15% sulfuric acid and holding the starch at room temperature to 35° C. for several days. During the process, there is gradual erosion of the starch and conversion of the amorphous amylose regions to soluble sugars. The main crystalline granule structure remains intact and is substantially amylopectin, preferably at least 95% amylopectin. An example of a starch modified by acid hydrolysis is Stellar™, manufactured by A. E. Staley Company. Stellar™ is made by sequential acid hydrolysis and fractionation of granular amylose-amylopectin starch materials. The DE of Stellar™ is between about 6 to 10.

Branched chain amylopectin starches are obtained from waxy grains and are generally referred to as waxy maize starches. Waxy maize starches have substantially no straight chain amylose starch.

The fat mimetic is used in the spreadable margarine type formulation of the present invention at a level of from about 3.5% to about 8% and in the squeezable margarine formulation at a level of from about 4% to about 10%. All percentages used herein are by weight based on the margarine product unless otherwise indicated.

Inulin is present in the non-fat spreadable margarine product and squeezable margarine at a level of from about 10% to about 50%. At levels above about 23%, however, the inulin imparts a sweet taste which may be undesirable in some products. The inulin is functional to impart the desired properties of the non-fat margarine substitute of the present invention without any modifying components. In an important embodiment of the present invention, it has been determined that the apparent sweetness of inulin can be reduced if calcium citrate or microreticulated microcrystalline cellulose is added to the formulation. The calcium citrate utilized is preferably of the type described in U.S. Pat. No. 5,149,552, which issued on Sep. 22, 1992. The calcium citrate of this patent has the formula: $Ca_n(C_6H_5O_7)_2$; wherein n is a value from 2.5 to 2.95.

Microreticulated microcrystalline cellulose is produced by subjecting an aqueous dispersion of microcrystalline cellulose to high pressure homogenization. This process is fully described in U.S. Pat. No. 5,011,701 to Baer, et al. The calcium citrate or microreticulated microcrystalline cellulose, if used, is present at a level of from about 0.75% to about 3%.

It has also been determined that the sodium salt of racemic 2-(4-methoxyphenoxy) propionic acid can be used to reduce the sweetness of inulin and also mask the starchy flavors of those compositions containing starch. The propanoate salt is used at a level of from about 50 ppm to about 200 ppm.

Inulin is a polysaccharide derived from various plant tubers, such as dahlia, jerusalem artichokes and chicory. Inulin is a polysaccharide of fructose units with a molecular weight of about 5,000. The molecular weight of inulin is dependent upon its source.

Bulking agents useful for both the non-fat margarine type product and the non-fat squeezable product are selected from the group consisting of non-gelling maltodextrins, polydextrose and corn syrup solids having a DE of from about 24 to about 42. The bulking agent is present in the non-fat spreadable margarine product and squeezable margarine formulations which contain inulin at a level of from about 0 to about 5%. That is, the bulking agent is optional in the non-fat formulations containing inulin. If used in these formulations, the bulking agent is present at a level of from about 1% to about 5%. The bulking agent is present in the non-fat squeezable margarine product which does not contain inulin at a level of from about 5% to about 10%.

A gum is used in the non-fat squeezable margarine produced with an enzyme modified starch and a bulking agent, but is optional in the non-fat spreadable margarine and squeezable margarine produced with acid modified starch and inulin. The gum is present at a level of from about 0.1% to about 2.0%, preferably from about 0.4% to about 1.75%. The gum may be selected from any of the food grade gums, such as xanthan gum, guar gum, gum acacia, alginates, carrageenans, pectins and gelatin. The preferred gum is xanthan gum.

The non-fat margarine and squeezable margarine of the present invention also contain salt at a level of from about 1.0% to about 2.5%. The formulations may also contain vitamins, preservatives, flavoring components and coloring components. Water is present at a level of from about 65% to about 85%.

While a typical spreadable and squeezable margarine type texture and flavor can be attained without the presence of any fat, fats and oils can be included in the formulations at levels up to about 15%, if desired. Suitable fats include butterfat, vegetable oils hydrogenated vegetable oils, flavored oils known as butter oils and non-digestible fats and oils, such as polyol fatty acid esters, particularly fatty acid esters of sucrose. If used, the fat and oil may be present at a level of from about 0.5% to about 60%. At levels of fat above about 15%, an emulsifier is required.

Suitable emulsifiers for tablespreads include mono- and di-glycerides, lactic acid esters of monoglycerides, diacetyl tartaric acid esters of monoglycerides (DATEM), propylene glycol esters of monoglycerides (PGME), succinylated monoglycerides (SMG), ethoxylated monoglycerides, sodium stearoyl-2-lactylate, polyglycerol esters of saturated fatty acids, Polysorbate 60, Polyglycerate 60 (ethoxylated mono- and diglycerides), mono-, di- and tri- fatty acid esters of sucrose, lecithin, including modified lecithin. The emulsifier or combination of emulsifiers is used at a level in the range of 0.2–12%, basis the fat in the product.

The compositions of the present invention are particularly suitable for marketing a spread which is labeled as a saturated fat-free spread. Under FDA requirements in the United States, a spread labeled as being saturated fat-free must have less than 0.5 grams of saturated fat per one tablespoon serving. This requirement can be met utilizing various levels of fats and oils. For example, only 5% butterfat can be present in the composition to meet the 0.5 gram requirement, whereas 45% of canola oil could be used and still meet the 0.5 gram requirement. Other vegetable oils can be used at various levels within the range of 5% to 60% to meet the requirement of 0.5 grams of saturated fat. Suitable fats and oils include canola oil, soybean oil, corn oil, butterfat, sunflower oil and safflower oil.

In the manufacture of the non-fat spreadable margarine, squeezable margarine containing inulin, a salt solution is first prepared in a holding tank. The preservatives used are also combined with the salt in the salt solution. In general, the salt solution will contain from about 1% to about 5% salt. The salt solution is pumped to a second tank where it is mixed with the fat mimetic, the bulking agent, if used, the inulin and any flavors and colorants. The salt solution and other components are metered into the batch mix tank at levels sufficient to provide the desired levels in the finished product.

After being combined in the batch mix tank, the non-fat spreadable formulation is pumped to a high pressure homogenizer, such as a Rannie homogenizer. It has been determined that the non-fat margarine product must be processed at a pressure above 6,000 psig to obtain the rheological properties desired in the finished product. The gel strength is rapidly reduced at homogenization pressures below about 6,000 psig. Homogenization pressures of from about 8,000 psig to about 15,000 psig are desirable. The non-fat margarine product after being homogenized is transferred to the holding tank. Since substantial heat is developed during processing through the high pressure homogenization apparatus, the formulation is then pumped through cooling heat exchangers prior to being packaged at a temperature of 60° F. to provide a non-fat spreadable margarine after a holding period of refrigerated storage at a temperature of from about 35° F. to about 50° F. for from about 10 hours to about 30 hours.

Figure 2:
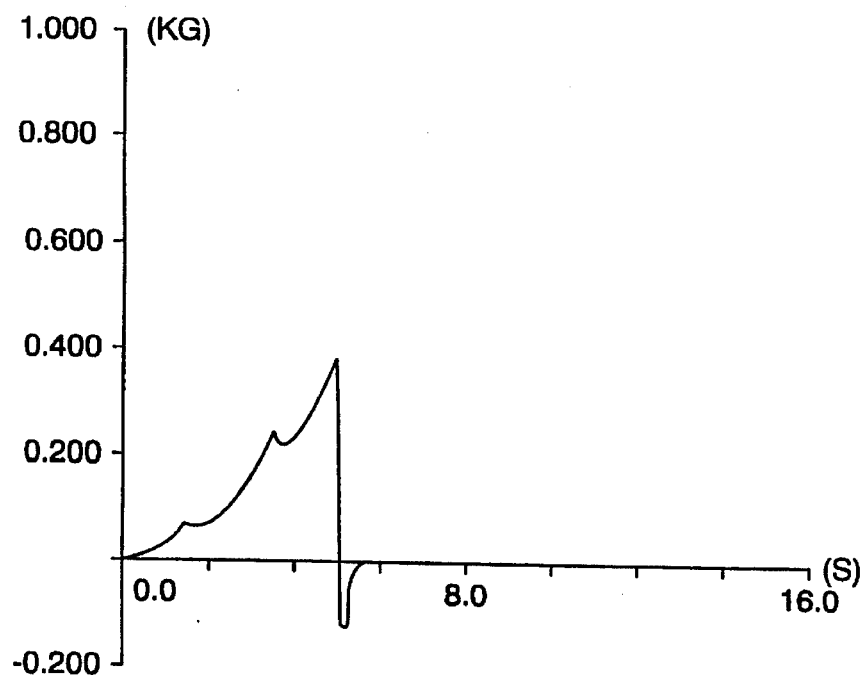
FIG. 2 is a plot of gel penetration of a 30% inulin gel.
Figure 3:
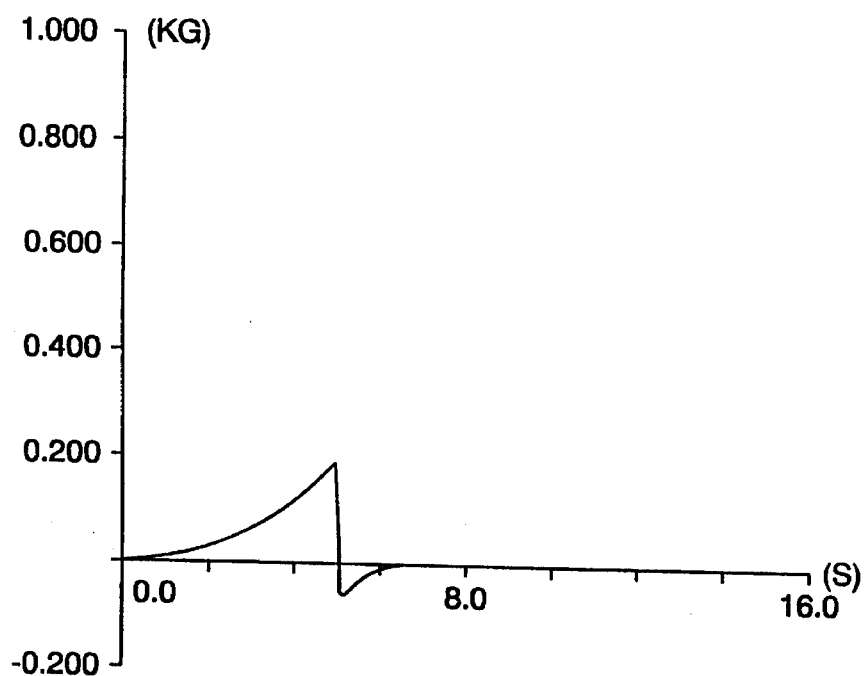
FIG. 3 is a plot of the gel penetration of a 25% inulin/5% starch gel.

As shown in FIG. 1, the gel strength of various materials after being processed in accordance with the above method is shown. As can be seen, the gel strength of the fat mimetic, Stellar™ is 0. The gel strength of inulin is 84.5. The combination of 25% inulin and 5% Stellar™ is 130.4. This shows that the Stellar™ reacts synergistically with the inulin to cause an increase in gel strength of greater than 50%. As shown in FIG. 2, the gel penetration of a 30% inulin composition displays a brittle profile as seem by the sharp break at the point (1). A composition wherein 5% of the inulin is replaced with Stellar™ displays a smooth non-brittle profile, as seen in FIG. 3.

The non-fat squeezable margarine without inulin is prepared by a different method. The fat mimetic is first placed into solution and heated to a temperature of about 190° F. to activate the fat mimetic. The fat mimetic is then held in a tank for subsequent formulation. The xanthan gum and bulking agent are mixed in a second tank and held for use in preparing the formulation. A salt solution is prepared in a third tank and is held for preparing the formulation. The three mixtures are proportioned into a fourth tank in proportions sufficient to prepare the final formulation. The colors and flavors are metered into the fourth tank in suitable amounts. Thereafter, the mixture is processed through a high shear mixer, such as a Pentax™ mixer, which is a horizontal rotating pin type mixer. It should be understood that high shear mixing is to be distinguished from high shear homogenization. High shear homogenization imparts much more shear force than does high shear mixing. The mixture is then transferred to a holding tank from which it is pumped to a cooling heat exchange apparatus prior to being packaged at a temperature of 60° F. The non-fat squeezable margarine product is then held at refrigeration temperatures of from about 35° F. to about 50° F. for a period of between about 10 and about 21 days prior to developing the desired rheological properties similar to that of spreadable full fat margarine.

The following examples further illustrate various features of the invention, but are intended to in no way limit the scope of the invention, which is set forth in the appended claims.

Example 1

A non-fat spreadable margarine type product was prepared from the components set forth in Table 1.

TABLE 1

| Ingredients | Percentages |
| --- | --- |
| Water | 70.1755% |
| Inulin | 20.0000% |
| Stellar ™ modified starch | 5.0000% |
| Calcium Citrate | 1.5000% |
| Vitamin A (Type 250-S) | 0.0148% |
| Salt (Sodium Chloride) | 2.0000% |
| Sodium Benzoate | 0.0500% |
| Potassium Sorbate | 0.0500% |
| Calcium Disodium EDTA | 0.0075% |
| Lactic Acid (50%) | 0.2500% |
| Titanium Dioxide (TiO$_2$) | 0.1000% |
| Yellow #5 | 0.0016% |
| Yellow #6 | 0.0006% |
| Mouthfeel (MV04) | 0.1500% |
| Butter Flavor | 0.7000% |
| TOTAL | 100.0000% |

The non-fat spreadable margarine was prepared by combining 15% of the water with the salt, the potassium sorbate, the sodium benzoate and the calcium disodium EDTA in a holding tank to provide a salt solution. The salt solution was maintained at a temperature of 120° F. The salt solution was metered, along with the inulin, the Stellar™, the flavor and color components and the remaining water, into a batch mix tank. The mixture was pumped through a Rannie homogenizer and was homogenized at a pressure of 11,000 psig. The formulation emerged from the Rannie homogenizer at a temperature of 150° F. The formulation was transferred to a holding tank and was pumped through cooling heat exchangers to reduce the temperature to 60° F. for packaging. The spreadable margarine formulation was held at a refrigeration temperature of 40° F. for 1 day to attain the desired rheological properties similar to full fat margarine.

Example 2

A non-fat squeezable margarine type product was prepared from the components set forth in Table 2.

TABLE 2

| Ingredients | Percentages |
| --- | --- |
| Water | 77.9326% |
| Inulin | 12.0000% |
| Stellar ™ modified starch | 5.0000% |
| Flavor | 2.9000% |
| Salt | 2.0000% |
| Lactic Acid | 0.0650% |
| Sodium Benzoate | 0.0500% |
| Potassium Sorbate | 0.0500% |
| Yellow #5 | 0.0016% |
| Yellow #6 | 0.0008% |
| TOTAL | 100.0000% |

The non-fat squeezable margarine was prepared by combining 15% of the water with the salt, the potassium sorbate and the sodium benzoate and the calcium disodium EDTA in a holding tank to provide a salt solution. The salt solution was maintained at a temperature of 120° F. The salt solution was metered, along with the inulin, the Stellar™, the flavor and color components and the remaining water, into a batch mix tank. The mixture was pumped through a Rannie homogenizer and was homogenized at a pressure of 11,000 psi. The formulation emerged from the Rannie homogenizer at a temperature of 150° F. The formulation was transferred to a holding tank and was pumped through cooling heat exchangers to reduce the temperature to 60° F. for packaging. The spreadable margarine formulation was held at a refrigeration temperature of 40° F. for 1 day to attain the desired rheological properties.

Example 3

A non-fat squeezable type margarine product was prepared from the formulation set forth hereinbelow in Table 3.

TABLE 3

| Ingredients | Percentages |
| --- | --- |
| Water | 79.3685% |
| Paselli SA2 ™ gelling maltodextrin | 8.0000% |
| Lodex 15 ™ non-gelling maltodextrin | 8.5000% |
| Xanthan gum | 0.5000% |
| Vitamin A | 0.0148% |
| Salt | 2.0000% |
| Sodium Benzoate | 0.0500% |
| Potassium Sorbate | 0.5000% |
| Calcium Disodium EDTA | 0.0075% |
| Lactic Acid (50%) | 0.1570% |
| Yellow #5 | 0.0016% |

TABLE 3-continued

| Ingredients | Percentages |
| --- | --- |
| Yellow #6 | 0.0006% |
| Sucrose | 0.5000% |
| Mouthfeel (MV04) | 0.1500% |
| Butter Flavor | 0.7000% |
| TOTAL | 100.0000% |

The non-fat squeezable margarine was prepared as follows: The Paselli SA2™ gelling type maltodextrin was added to a mixing tank along with 30% of the water. The mixture was stirred and heated to a temperature of 190° F. until required for use. The xanthan gum and non-gelling maltodextrin were added to a second holding tank with 25% of the water and were stirred to provide a mixture. The salt, potassium sorbate, sodium benzoate and calcium disodium EDTA were added to a third mixing tank with the remaining water and were stirred to provide a solution. The Paselli SA™ mixture, the xanthan gum mixture and the salt solution were proportioned to a fourth mixing tank where the flavors and colorants were added. The mixture was then processed through a Pentax™ high shear mixer and transferred to a holding tank. The mixture was transferred through a cooling heat exchanger to provide a temperature of 60° F. and was packaged into squeezable margarine type containers. The containers were held at refrigeration temperatures for 15 days to provide the desired rheological properties.

Example 4

A non-fat spreadable margarine type product was prepared from the components set forth in Table 4 using the procedure of Example 1.

TABLE 4

| Ingredients | Percentages |
| --- | --- |
| Water | 74.3255% |
| Inulin | 17.0000% |
| Stellar ™ modified starch | 4.0000% |
| Waxy Maize Starch | 1.5000% |
| Vitamin A | 0.0148% |
| Salt | 0.0500% |
| Sodium Benzoate | 0.0500% |
| Potassium Sorbate | 0.0500% |
| Calcium Disodium EDTA | 0.0075% |
| Lactic Acid (50%) | 0.2500% |
| Titanium Dioxide (TiO$_2$) | 0.1000% |
| Yellow #5 | 0.0016% |
| Yellow #6 | 0.0006% |
| Butter Flavor | 0.7000% |
| TOTAL | 100.0000% |

The non-fat margarine prepared from the above components including a waxy maize starch had rheological and organoleptic properties similar to full fat margarine.

Example 5

A non-fat spreadable margarine type product was prepared from the components set forth in Table 5 using the procedure of Example 1.

TABLE 5

| Ingredients | Percentages |
| --- | --- |
| Water | 74.3255% |
| Inulin | 17.0000% |
| Stellar ™ modified starch | 4.0000% |
| Microreticulated Microcrystalline cellulose | 1.5000% |
| Vitamin A | 0.0148% |
| Salt | 2.0000% |
| Sodium Benzoate | 0.0500% |
| Potassium Sorbate | 0.0500% |
| Calcium Disodium EDTA | 0.0075% |
| Lactic Acid (50%) | 0.2500% |
| Titanium Dioxide (TiO$_2$) | 0.1000% |
| Yellow #5 | 0.0016% |
| Yellow #6 | 0.0006% |
| Butter Flavor | 0.7000% |
| TOTAL | 100.0000% |

The non-fat margarine prepared from the above components, including microreticulated microcrystalline cellulose had rheological and organoleptic properties similar to full fat margarine.

Example 6

A saturated fat-free tablespread was prepared utilizing an oil submix and a salt submix in preparing the product. The oil submix has the following components at the indicated levels:

| | % |
| --- | --- |
| Oil Submix | |
| Canola Oil | 88.298 |
| Polysorbate 60 | 11.198 |
| Vitamin #52 | 0.336 |
| Flavor #512 | 0.168 |
| | Total 100.000 |

The salt submix has the following components:

| Salt Submix | |
| --- | --- |
| Water (45° F.) | 79.336 |
| Salt | 19.68 |
| Potassium Sorbate | 0.492 |
| Sodium Benzoate | 0.492 |
| | Total 100.000 |

40% of the oil mix, 10% of the salt mix, 34% water, 15% inulin and 1% of minor components were then combined to provide a saturated fat-free tablespread having the following composition:

| Ingredient | % |
| --- | --- |
| Canola Oil | 37.123 |
| Water | 34.074 |
| Inulin | 15.000 |
| Water/Salt Submix | 10.166 |
| Oil Submix Solubles | 1.786 |
| Cream | 1.700 |
| Lactic Acid | 0.120 |
| CF #1 (Flavor) | 0.025 |
| EDTA | 0.006 |
| | Total 100.000% |

The process of preparing the saturated fat-free tablespread involves mixing the inulin, water, oil submix, salt submix and minor components in a propeller type mixing chamber. The mixture is then pumped through a high pressure homogenization step, i.e., a Rannie™ homogenizer. The temperature of the mixture is increased to 126° F. by passage through the high pressure homogenizer. The mixture is then pumped to a heat exchanger where the temperature of the mixture is reduced to 45°–50° F., after which the tablespread is packaged.

Example 7

The process of Example 1 was used to prepare a saturated fat-free tablespread having the following composition:

| Ingredient | % | Weight |
|---|---|---|
| Inulin - instant | 17.000% | 17.00 # |
| Water | 41.732% | 41.73 # |
| Stellar | 4.000% | 4.00 # |
| Water/Salt | 10.166% | 10.17 # |
| MRC (9%) | 22.200% | 22.20 # |
| Vitamin #52 | 0.006% | 2.72 g |
| Cream | 2.000% | 907.20 g |
| Butteroil | 1.600% | 725.76 g |
| Lactic acid | 0.100% | 45.36 g |
| HFCS | 0.100% | 453.60 g |
| Cypha | 0.0001% | 0.05 g |
| Starter Distillate | 0.180% | 81.65 g |
| Flavor #33 | 0.016% | 7.26 g |
|  | 100.000% | 99.82 # |

The presence of the propanoate salt provided a tablespread with a reduced sweetness and less starchy flavor as compared to the tablespread of Example 1.

Example 8

The method of claim 1 was used to prepare saturated fat-free tablespreads having the following formulations:

| Ingredients | Batch 1 Weight % | Batch 2 Weight % | Batch 3 Weight % |
|---|---|---|---|
| Water | 24.3060 | 19.3060 | 14.0360 |
| Inuline | 15.0000 | 15.0000 | 15.0000 |
| Soybean Oil | 50.0000 | 55.0000 | 60.0000 |
| Water/Salt Solution[1] | 10.1660 | 10.1660 | 10.1660 |
| Lactic Acid | .1000 | .1000 | .1000 |
| Color (Bowl) | .2000 | .2000 | .2000 |
| Flavor CF1 | .0250 | .0250 | .0250 |
| Flavor 512 | .0030 | .0030 | .0030 |
| Polysorbate 60 | .2000 | .2000 | .2000 |

Water/Salt Solution[1]

| Ingredients | Batch 1 Weight % |
|---|---|
| Water | 79.3360 |
| Salt | 19.6800 |
| Na Benzoate | .4920 |
| K Sorbate | .4920 |

After being packaged, the formulations were held at a refrigeration temperature of 40° F. for 1 day to attain the desired rheological properties of full-fat margarine.

What is claimed is:

1. A non-fat or low-fat spreadable or squeezable margarine consisting essentially of:
   (a) a fat mimetic selected from the group consisting of gelling type maltodextrins, starch modified by acid hydrolysis to remove amorphous regions therefrom and waxy maize starch,
   (b) from 1 to 5% of a bulking agent selected from the group consisting of non-gelling maltodextrins, polydextrose and corn syrup solids,
   (c) sufficient inulin to achieve the desired properties of a spreadable or squeezable margarine, and
   (d) water.

2. A margarine in accordance with claim 1 wherein said margarine also comprises a sweetness masking agent.

3. A margarine in accordance with claim 2 wherein said sweetness masking agent selected from the group consisting of calcium citrate, microreticulated microcrystalline cellulose and mixtures thereof which is present at a level of from about 0.75% to about 3.0% by weight, dry solids basis.

4. A margarine in accordance with claim 2 wherein said sweetness masking agent is the sodium salt of racemic 2-(4-methoxyphenoxy) propionic acid which is present at a level of from about 50 ppm to about 200 ppm.

5. A margarine in accordance with claim 2 wherein said inulin is present at a level of from 10% to about 23%.

6. A margarine in accordance with claim 1 wherein said margarine also comprises a gum.

7. A margarine in accordance with claim 6 wherein said gum is selected from the group consisting of xanthan gum, guar gum, gum acacia, alginates, carrageenans, pectin and gelatin and is present at a level of from about 0.1% to about 2.0%.

8. A margarine in accordance with claim 1 wherein said fat mimetic is present at a level of from about 3.5% to about 8%.

9. A margarine in accordance with claim 1 wherein said margarine also comprises salt at a level of from about 10% to about 2.5%.

10. A margarine in accordance with claim 1 which also comprises from about 0.5% to about 60% of a fat or oil.

11. A margarine in accordance with claim 1 wherein said inulin is present at a level of from about 10% to about 23%.

12. A margarine in accordance with claim 1 wherein said fat mimetic is a gelling type maltodextrin.

13. A margarine in accordance with claim 1 wherein said fat mimetic is a starch modified by acid hydrolysis to remove amorphous regions therefrom.

14. A margarine in accordance with claim 1 wherein said mimetic is a waxy maize starch.

15. A non-fat or low-fat squeezable margarine consisting essentially of:
   (a) a fat mimetic selected from the group consisting of gelling type maltodextrins, starch modified by hydrolysis to remove amorphous regions therefrom and waxy maize starch,
   (b) a bulking agent selected from the group consisting of non-gelling maltodextrins, polydextrose and corn syrup solids,
   (c) gum, and
   (d) water.

16. A margarine in accordance with claim 15 wherein said fat mimetic is present at a level of from about 4% to about 10%.

17. A margarine in accordance with claim 15 wherein said gum is selected from the group consisting of xanthan gum, guar gum, gum acacia, alginates, carrageenans, pectin and gelatin and is present at a level of from about 0.1% to about 2.0%.

18. A margarine in accordance with claim 15 wherein said bulking agent is present at a level of from about 5% to about 10%.

19. A margarine in accordance with claim 15 wherein said margarine also comprises salt at a level of from about 1.0% to about 2.5%.

20. A margarine in accordance with claim 15 which also comprises from 0.5% to about 60% of a fat or oil.

21. A method for manufacture of a non-fat or low-fat spreadable or squeezable margarine comprising providing a mixture consisting essentially of a fat mimetic selected from the group consisting of gelling type maltodextrins, starch modified by acid hydrolysis to remove amorphous regions therefrom and waxy maize starch, inulin and water and subjecting said mixture to high pressure homogenization of at least about 6,000 psig.

22. A method in accordance with claim 21 wherein said homogenization pressure is from about 6,000 psig to about 15,000 psig.

23. A method in accordance with claim 21 wherein said fat mimetic is present at a level of from about 3.5% to about 8% and said water is present at a level of from about 65% to about 85%.

24. A method in accordance with claim 21 wherein said inulin is present at a level of from about 10% to about 23%.

25. A method in accordance with claim 21 wherein said mixture also includes a sweetness masking agent selected from the group consisting of calcium citrate, microreticulated microcrystalline cellulose and mixtures thereof which is present at a level of from about 0.75% to about 3.0% and the sodium salt of racemic 2-(4-methoxyphenoxy) propionic acid which is present at a level of from about 50 ppm to about 200 ppm.

26. A method in accordance with claim 21 wherein said mixture also includes a gum.

27. A method in accordance with claim 21 wherein said gum is selected from the group consisting of xanthan gum, guar gum, gum acacia, alginates, carrageenans, pectin and gelatin and is present at a level of from about 0.1% to about 2.0%.

28. A method in accordance with claim 21 wherein said mixture also includes a bulking agent selected from the group consisting of non-gelling maltodextrins, polydextrose and corn syrup solids, which is present at a level of from about 1% to about 5%.

29. A method in accordance with claim 21 wherein said mixture also includes salt at a level of from about 1.0% to about 2.5%.

30. A method in accordance with claim 21 wherein said mixture also includes from about 0.5% to about 60% of a fat or oil.

31. A method in accordance with claim 21 wherein said mixture is held at refrigeration temperatures for a period of from about 10 hours to about 30 hours after said high pressure homogenization.

32. A non-fat or low-fat spreadable or squeezable margarine consisting essentially of:
    (a) a gelling type maltodextrin,
    (b) from 1 to 5% of a non-gelling maltodextrin,
    (c) sufficient inulin to achieve the desired properties of a spreadable or squeezable margarine, and
    (d) water.

* * * * *

UNITED STATES PATENT AND TRADEMARK OFFICE
CERTIFICATE OF CORRECTION

PATENT NO.   : 5,501,869
DATED        : March 26, 1996
INVENTOR(S)  : Buliga, et al.

It is certified that error appears in the above-indentified patent and that said Letters Patent is hereby corrected as shown below:

Column 10, Claim 9, line 2, change "10%" to --1.0%--.

Signed and Sealed this

Fifteenth Day of October, 1996

Attest:

BRUCE LEHMAN

*Attesting Officer*          *Commissioner of Patents and Trademarks*